US010479916B2

(12) United States Patent
Schmatloch et al.

(10) Patent No.: US 10,479,916 B2
(45) Date of Patent: *Nov. 19, 2019

(54) LATENT TWO-PART POLYURETHANE ADHESIVES CURABLE WITH INFRARED RADIATION

(71) Applicant: DOW GLOBAL TECHNOLOGIES LLC, Midland, MI (US)

(72) Inventors: Stefan Schmatloch, Horgen (CH); Joel Kunz, Horgen (CH); Sergio Grunder, Bachtobelstrasse (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/579,738

(22) PCT Filed: Jun. 14, 2016

(86) PCT No.: PCT/US2016/037446
§ 371 (c)(1),
(2) Date: Dec. 5, 2017

(87) PCT Pub. No.: WO2016/205251
PCT Pub. Date: Dec. 22, 2016

(65) Prior Publication Data
US 2018/0179319 A1 Jun. 28, 2018

Related U.S. Application Data

(60) Provisional application No. 62/316,677, filed on Apr. 1, 2016, provisional application No. 62/316,680, filed
(Continued)

(51) Int. Cl.
*C09J 175/08* (2006.01)
*C08G 18/24* (2006.01)
*C08G 18/48* (2006.01)
*C08G 18/79* (2006.01)
*C08J 3/24* (2006.01)
*C08J 3/28* (2006.01)
(Continued)

(52) U.S. Cl.
CPC ............ *C09J 175/08* (2013.01); *B32B 37/12* (2013.01); *C08G 18/165* (2013.01); *C08G 18/2063* (2013.01); *C08G 18/242* (2013.01); *C08G 18/244* (2013.01); *C08G 18/482* (2013.01); *C08G 18/4812* (2013.01); *C08G 18/4837* (2013.01); *C08G 18/5024* (2013.01); *C08G 18/6674* (2013.01); *C08G 18/798* (2013.01); *C08J 3/24* (2013.01); *C08J 3/244* (2013.01); *C08J 3/28* (2013.01); *C09J 5/06* (2013.01); *C09J 11/04* (2013.01); *C09J 175/04* (2013.01); *B32B 7/12* (2013.01); *B32B 2037/1253* (2013.01); *C08J 2375/04* (2013.01); *C08K 3/04* (2013.01); *C08K 3/346* (2013.01); *C08K 3/36* (2013.01); *C08K 9/00* (2013.01); *C09J 2205/31* (2013.01); *C09J 2400/226* (2013.01); *C09J 2475/00* (2013.01)

(58) Field of Classification Search
CPC .............. C08G 18/165; C08G 18/2063; C08G 18/242; C08G 18/244; C08G 18/4812; C08G 18/482; C08G 18/4837; C08G 18/5024; C08G 18/6674; C08G 18/798; C08G 18/485; C08G 18/4833; C08G 18/7671; C08G 18/7664; C08G 18/82; C08G 18/73; C08J 3/24; C08J 3/244; C08J 3/28; C08J 2375/04; C08K 3/04; C08K 3/346; C08K 3/36; C08K 9/00; C09J 5/06; C09J 2205/31; C09J 175/04; C09J 175/08; C09J 11/04; C09J 2400/226; C09J 2475/00; B32B 37/12
See application file for complete search history.

(56) References Cited

U.S. PATENT DOCUMENTS 4,742,113 A 5/1988 Gismond et al.
4,876,308 A 10/1989 Melby et al.
(Continued)

FOREIGN PATENT DOCUMENTS

| EP | 1435366 A1 | 7/2004 |
|---|---|---|
| WO | 2009/015149 A1 | 1/2009 |
| WO | 2012/078331 A1 | 6/2012 |
| WO | 2012/158664 A2 | 11/2012 |
| WO | 2014/029787 A1 | 2/2014 |
| WO | 2014/029891 A1 | 2/2014 |

(Continued)

OTHER PUBLICATIONS

International Search Report for Application No. PCT/US2016/037446 dated Sep. 26, 2016.

Primary Examiner — Christopher M Rodd
(74) Attorney, Agent, or Firm — The Dobrusin Law Firm, P.C.

(57) ABSTRACT

Disclosed are latent two-part polyurethane adhesives that rapidly develop adhesive strength when cured by application of infrared radiation containing a polyol component which includes; one or more polyols having a hydroxyl equivalent weight of 400 to 2000 and a nominal hydroxyl functionality of 2 to 4; one or more aliphatic diol chain extenders; and one or more latent room temperature organometallic catalysts; b) a polyisocyanate component containing one or more polyisocyanate compounds; and v) a carboxylic acid-blocked cyclic amidine compound and vi) a phenol-blocked cyclic amidine compound which each may be located in the polyol component or the isocyanate component. Further disclosed are methods of bonding structures together using the latent two-part polyurethane adhesives.

20 Claims, No Drawings

Related U.S. Application Data on Apr. 1, 2016, provisional application No. 62/213,650, filed on Sep. 3, 2015, provisional application No. 62/181,359, filed on Jun. 18, 2015.

(51) Int. Cl.

| | |
|---|---|
| *C09J 175/04* | (2006.01) |
| *C08G 18/16* | (2006.01) |
| *C08G 18/20* | (2006.01) |
| *C08G 18/66* | (2006.01) |
| *C09J 5/06* | (2006.01) |
| *C09J 11/04* | (2006.01) |
| *B32B 37/12* | (2006.01) |
| *C08G 18/50* | (2006.01) |
| *C08K 3/04* | (2006.01) |
| *C08K 3/34* | (2006.01) |
| *C08K 3/36* | (2006.01) |
| *C08K 9/00* | (2006.01) |
| *B32B 7/12* | (2006.01) |

(56) References Cited

U.S. PATENT DOCUMENTS

| | | | |
|---|---|---|---|
| 5,143,996 | A | 9/1992 | Chung et al. |
| 5,606,003 | A | 2/1997 | Wang et al. |
| 6,926,949 | B1 | 8/2005 | Haelg et al. |
| 7,416,599 | B2 | 8/2008 | Hsieh et al. |
| 2002/0068808 | A1* | 6/2002 | Kometani .......... C08G 18/0885 528/54 |
| 2012/0028561 | A1 | 2/2012 | Takado |
| 2013/0255880 | A1 | 10/2013 | Mahdi et al. |
| 2015/0159064 | A1 | 6/2015 | Roock et al. |
| 2015/0203728 | A1 | 7/2015 | Burckhardt et al. |
| 2015/0247073 | A1 | 9/2015 | Kelch |

FOREIGN PATENT DOCUMENTS

| | | |
|---|---|---|
| WO | 2014/040909 A1 | 3/2014 |
| WO | 2014/040916 A1 | 3/2014 |

\* cited by examiner

LATENT TWO-PART POLYURETHANE ADHESIVES CURABLE WITH INFRARED RADIATION

FIELD

Disclosed are latent two-part polyurethane adhesives that rapidly develop adhesive strength when cured by application of infrared radiation. Further disclosed are methods of bonding structures together using the latent two-part polyurethane adhesives.

BACKGROUND

Polyurethanes are a well-known type of adhesive. They contain precursor materials that cure in place to form an adhesive layer. Polyurethane adhesives come in one-part and two-part types. One-part types generally exhibit a moisture cure or a heat-activated cure. Two-part types consist of a resin component that includes one or more polyisocyanate compounds, and a curative component that includes one or more polyols. When the two components are mixed, the polyisocyanates and polyols react to form a cured polyurethane adhesive. A polyurethane adhesive can be formulated to cure at room temperature or upon exposure to certain conditions, an example of which is an elevated temperature. As the adhesive cures, it can form a strong adhesive bond to many types of substrates.

Two part curable compositions are used in a variety of applications such as adhesives, coatings, foams and the like. Two part compositions are used where rapid cure is required for the application, especially where the two parts are not shelf stable when in contact with one another. Shelf stable means that the composition does not cure in storage. It is desirable that the adhesive composition exhibit a suitable open time and cure rapidly. The "open time" refers to the amount of time after the two components are mixed that the adhesive remains flowable and capable of bonding to a substrate.

One way of obtaining both a long open time and a fast cure is by formulating the adhesive to have a heat-activated cure. Such an adhesive cures slowly at ambient temperature, thereby allowing the adhesive to be applied and the substrates positioned while the adhesive remains flowable. The resulting assembly is then heated to an elevated temperature at which rapid curing takes place.

Heating using conventional curing ovens tends to be slow and expensive, and may not be well-suited for large or complex assemblies. To lower costs and speed the cure, infrared heating methods have been developed. These methods permit the substrate/adhesive assembly to be brought more rapidly to the curing temperature than with convection ovens.

Infrared heating methods can be used to partially cure the adhesive to develop enough initial bond strength to allow the adhered assembly to be handled in downstream manufacturing operations, while allowing full cure to develop later. This approach can speed production processes, as it is not necessary to wait for the adhesive to fully cure before subsequent manufacturing steps can take place.

Infrared heating has a further advantage in that it can be targeted, so only specific locations of the assembly are heated. This allows for spot-curing, i.e., curing only predetermined portions of the adhesive. Strong localized adhesive bonds form where the localized heat is applied. Even though much of the adhesive remains uncured or only partially cured, these localized bonds provide enough strength to the assembly that it can be manipulated. This process saves time, because localized heating can be accomplished more rapidly than curing the entire assembly, and saves energy as only a portion of the assembly needs to be heated. The subsequent full cure can take place at ambient temperature, or if an elevated temperature cure is needed, this full curing step sometimes can be combined with another manufacturing step, such as a paint curing step, to save costs and speed production rates.

Two part fast curing two part adhesives are disclosed in WO2014/040909 and US2015/0203728. Such two part adhesive systems provide limited flexibility. Process flexibility may be defined as long open time that is the time between application of the adhesive to a first substrate and joining of a second substrate to the first substrate using the adhesive. Further long mixer stand-alone times, the time the mixed two part adhesive can be kept in the mixer unit (static or dynamic) between two applications without gelling, are required to reduce the flushing intervals and therefore reduce waste. Fast cure, as evidenced by fast strength build up, once the open time window closes is desired to provide handling strength as soon as possible after final assembly of the components.

Thus, what is needed is a two part adhesive that provides long open times, sufficient cure strength after one hour to allow handling of bonded parts and low reactivity loss after storage for at least one month. What are needed are bonding methods using two part adhesives that allow reasonable time to contact and locate substrates to one another with the adhesive disposed between the substrates, wherein the substrates can be handled after about one hour and the adhesive retains significant reactivity for at least a month such that final cure of the adhesive bond can be achieved after at least a month.

SUMMARY

Disclosed are compositions comprising a polyol component and an isocyanate component, wherein: a) the polyol component includes; i) one or more polyols having a hydroxyl equivalent weight of 400 to 2000 and a nominal hydroxyl functionality of 2 to 4; ii) one or more aliphatic diol chain extenders; and iii) one or more latent room temperature organometallic catalysts; b) the polyisocyanate component includes; iv) one or more polyisocyanate compounds; wherein the polyisocyanate component and the polyol component are contacted at an isocyanate index of about 1.0 to about 1.8; and v) a carboxylic acid-blocked cyclic amidine compound and vi) a phenol-blocked cyclic amidine compound which each may be located in the polyol component or the isocyanate component, wherein the composition is useful as a two-component polyurethane adhesive composition. The one or more latent room temperature organometallic catalysts may contain tin, zinc or bismuth. The one or more latent room temperature organometallic catalysts may be zinc alkanoates, bismuth alkanoates, dialkyltin alkanoates, dialkyl tin mercaptides, dialkyl tin bis(alkylmercaptoacetates), dialkyltin thioglycolates or mixtures thereof. The one or more latent room temperature organometallic catalysts may be dialkyl tin mercaptides, dialkyl tin bis(alkylmercaptoacetates), dialkyltin thioglycolates or mixtures thereof. The one or more cyclic amidine compounds may be 1,8-Diazabi-cyclo[5.4.0]undec-7-ene) or 1,5-Diazabicyclo[4.3.0]non-5-ene. The one or more latent room temperature organo-metallic catalysts may be present in an amount of about 0.005 to about 1.0 percent by weight based on the weight of the polyol component. The phenol blocked cyclic amidines may be present in an amount of about 0.01 to about 2.0 percent by weight based on the weight of the polyol or polyisocyanate component. The carboxylic acid blocked cyclic amidines may be present in an amount of about 0.01 to about 2.0 percent by weight the polyol or polyisocyanate component. Disclosed is a cured adhesive formed by curing a two-component polyurethane adhesive composition disclosed herein.

Disclosed is a method of bonding two substrates, comprising forming a layer of the two-component polyurethane adhesive at a bondline between two substrates, and curing the layer at the bondline to form a cured adhesive bonded to each of the substrates. The method may comprise combining the components of the two-component poly-urethane adhesive, forming a layer of the adhesive at a bondline between two substrates to form an assembly, partially curing the adhesive layer at the bondline by applying infrared radiation to a portion of the assembly, and, in a subsequent and separate curing step, completing the cure of the adhesive layer. The partial curing step can be performed by curing only one or more predetermined, localized portions of the adhesive layer at the bondline by applying infrared radiation only to the one or more predetermined, localized portions of the assembly to produce an adhesive layer having at least partially cured portions and uncured portions, and the uncured portions of the adhesive layer then can be cured in the subsequent and separate curing step. The method may comprise: a) contacting the polyol component and the isocyanate component as disclosed herein and mixing to form a homogeneous mixture; b) applying the mixture to a first substrate; and c) contacting a second substrate with the first substrate with the mixture of part a disposed between the first and second substrate; d) exposing a portion of the mixture to heat under conditions such that the mixture partially cures sufficiently such that the first and second substrate are bonded such that the substrates can be moved. The method may further comprise e) heating the two substrates at a temperature for a time to fully cure the mixture so as to bond the two substrates together. The heat may be applied in step d by infrared heating. The time between steps d and e may be about 1 hour of more, or about 24 hours or more. One or both of the substrates may be fiber reinforced plastic.

Disclosed is a cured adhesive formed by curing the two-component polyurethane adhesive composition disclosed herein. Disclosed is a structure comprising two or more substrates bonded together with the cured adhesive based on the curable compositions disclosed herein wherein the cured adhesive is disposed between portions of each of the substrates. At least one of the substrates may comprise fiber reinforced plastics. One of the other substrates may comprise a different material such as metal, glass, plastics, or thermoset resins, or may not contain fibers as reinforcing structures.

The adhesive composition adheres strongly to many substrates. The adhesives bond well to fiber reinforced plastic substrates. The adhesive composition exhibits good latency, even in cases in which the adhesive is room-temperature curable. This is a significant advantage, as it permits the adhesive composition to be formulated for an ambient temperature cure if desired. Despite its latency, the adhesive cures well at room temperature, without the need for applied heating (apart from an exothermic temperature rise due to the curing reaction itself). The adhesive compositions exhibit relatively long open times and rapid strength build up after the open time window closes.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Disclosed is a curable composition comprising a polyol component and an isocyanate component, wherein: a) the polyol component includes; i) one or more polyols; ii) one or more aliphatic diol chain extenders; and iii) one or more latent room temperature organometallic catalysts; b) the polyisocyanate component includes; iv) one or more polyisocyanate compounds; wherein the polyisocyanate component and the polyol component are contacted at an isocyanate index of about 1.0 to about 1.8; and v) a carboxylic acid-blocked cyclic amidine compound and vi) a phenol-blocked cyclic amidine compound which each may be located in the polyol, isocyanate or both components.

The compositions disclosed may further any one or more of the features described in this specification in any combination, including the preferences and examples listed in this specification, and includes the following features: the one or more latent room temperature organometallic catalysts contain tin, zinc or bismuth; the one or more latent room temperature organometallic catalysts are zinc alkanoates, bismuth alkanoates, dialkyltin alkanoates, dialkyl tin mercaptides, dialkyl tin bis(alkylmercaptoacetates), dialkyltin thioglycolates or mixtures thereof; the one or more latent room temperature organometallic catalysts are dialkyl tin mercaptides, dialkyl tin bis(alkylmercaptoacetates), dialkyltin thioglycolates or mixtures thereof; the one or more cyclic amidine compounds comprise 1,8-Diazabicyclo[5.4.0]undec-7-ene or 1,5-Diazabi-cyclo[4.3.0]non-5-ene; the one or more latent room temperature organometallic catalysts may be present in an amount of about 0.005 to about 1.0 percent by weight based on the weight of the polyol component, the phenol blocked cyclic amidines may be present in an amount of about 0.01 to about 2.0 percent by weight based on the weight of the polyol or polyisocyanate component; and the carboxylic acid blocked cyclic amidines may be present in an amount of about 0.01 to about 2.0 percent by weight based on the weight of the polyol or polyisocyanate component; the polyol component contains one or more particulate fillers; the polyisocyanate component contains one or more particulate fillers; the one or more polyols having a hydroxyl equivalent weight of 400 to 2000 and a nominal hydroxyl functionality of 2 to 4 may be present in an amount of about 35 to about 80 percent by weight of the polyol component; the one or more chain extenders may be present in an amount of about 1 to about 10 percent by weight of the polyol component; the polyisocyanate compound is present in an amount of about 20 to about 65 percent by weight of the polyisocyanate component; the one or more latent room temperature organometallic catalysts may be present in an amount of about 0.020 to about 0.050 percent by weight based on the weight of the polyol component, the phenol blocked cyclic amidines are present in an amount of about 0.01 to about 1.0 percent by weight based on the weight of the polyol or polyisocyanate component; the carboxylic acid blocked cyclic amidines may be present in an amount of about 0.01 to about 1.0 percent by weight based on the weight of the polyol or polyisocyanate component; open time of the composition after contacting the polyol component and the isocyanate component may be 8 minutes or greater; the acid-blocked amidine compound may be blocked with one or more aliphatic carboxylic acids having 1 to 24 carbon atoms; the phenol blocked amidine compound may be blocked with one or more of phenol or a substituted phenol; the polyisocyanate component may include both aliphatic and aromatic isocyanates; the particulate filler may constitute about 10 to about 50 percent of the weight of the polyisocyanate component; or about 25 to about 60 percent of the weight of the polyol component.

The methods disclosed may further comprise any one or more of the features described in this specification in any combination, including the preferences and examples listed in this specification, and includes the following features: the method may include e) heating the two substrates at a temperature for a time to fully cure the mixture so as to bond the two substrates together; the heat may be applied in step d by infrared heating; and the time frame between steps d and e may be about 1 hour or more or about 24 hours or more; and at least one of the substrates may be a fiber reinforced plastic.

One or more as used herein means that at least one, or more than one, of the recited components may be used as disclosed. Nominal as used with respect to functionality means the theoretical functionality, generally this can be calculated from the stoichiometry of the ingredients used. The actual functionality may be different due to imperfections in raw materials, incomplete conversion of the reactants and formation of by-products. Durability in this context means that the composition once cured remains sufficiently strong to perform its designed function, for instance the adhesive holds substrates together for the life or most of the life of the structure containing the cured composition. As an indicator of this durability, the curable composition (e.g. adhesive) preferably exhibits excellent results during accelerated aging. Preferably this means that after a set of substrates bonded with the adhesive is exposed to heat aging, the failure mode in Quick Knife adhesion or Lap Shear testing is cohesive, meaning the adhesive breaks before the bond of the adhesive to the substrate breaks. Isocyanate content means the weight percent of isocyanate groups in the designated component, such as prepolymer. The isocyanate content can be measured by analytical techniques known to one skilled in the art, for example by potentiometric titration with an active hydrogen containing compound, such as dibutyl amine. The residual content of a component can be calculated from the ingredients utilized to prepare the component or composition. Alternatively, it can be determined utilizing known analytical techniques. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight or the curable compositions unless otherwise specified. Based on the weight of or total weight the composition means the weight of both the polyol and the isocyanate component unless stated otherwise.

The term isocyanate-reactive compound as used herein includes any organic compound having nominally at least two isocyanate-reactive moieties. An isocyanate reactive moiety can be an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate reactive moieites, such as active hydrogen moieties, are —COOH, —OH, —NH$_2$, —NH—, —CONH$_2$, —SH, and —CONH—. Preferable active hydrogen containing compounds, isocyanate reactive moiety containing compounds, include polyols, polyamines, polymercaptans and polyacids. More preferably, the isocyanate reactive compound is a polyol, and is even more preferably a polyether polyol.

Ingredient a) of the polyol component is a polyether polyol or mixture of poly-ether polyols. Each such polyether polyol has a hydroxyl equivalent weight of 400 to 2000. The hydroxyl equivalent weight of each polyol may be at least 500, at least 800 or at least 1000, and may be up to 1800, up to 1500 or up to 1200.

Each such polyether polyol has a nominal hydroxyl functionality of 2 to 4. By "nominal functionality" of a polyether polyol, it is meant the average number of oxyalkylatable hydrogen atoms on the initiator compound that is alkoxylated to form the polyether polyol. The actual functionalities of the polyether polyol(s) may be somewhat lower than the nominal functionality, due to side-reactions that occur during the alkoxylation process. In the case of a mixture of polyether polyols, the number average nominal functionality preferably is 2 to 3.5 and especially 2.5 to 3.5.

The polyether polyol(s) may be selected from homopolymers of propylene oxide and copolymers of 70 to 99% by weight propylene oxide and 1 to 30% by weight ethylene oxide. Such a copolymer of propylene oxide and ethylene oxide is generally preferred if a single polyether polyol is present. If two or more polyether polyols are present, it is preferred that at least one is such a copolymer of propylene oxide and ethylene oxide. In the case of a copolymer, the propylene oxide and ethylene oxide may be randomly copolymerized, block copolymerized, or both. In some embodiments, 50% or more of the hydroxyl groups of the polyether polyol or mixture of polyether polyols are primary hydroxyl, with the remainder being secondary hydroxyl groups. 70% or more of the hydroxyl groups in the polyether polyol or mixture thereof may be primary hydroxyl.

The polyether polyol(s) (ingredient a)) may constitute about 35 weight percent or greater of the polyol component. The polyether polyol(s) may constitute about 40 weight percent or greater or about 50 weight percent or greater of the polyol component, may constitute about 80 weight percent or less, about 65 weight percent or less or about 55 weight percent or less.

Ingredient b) of the polyol component is one or more aliphatic diol chain extenders. The aliphatic diol chain extender(s) each have a hydroxyl equivalent weight of about 200 or less, about 100 or less, about 75 or less or about 60 or less, and about two aliphatic hydroxyl groups per molecule. Examples of these are monoethylene glycol, diethylene glycol, triethylene glycol, 1,2-propane diol, 1,3-propane diol, 2,3-dimethyl-1,3-propanediol, dipropylene glycol, tripropylene glycol, 1,4-butanediol, 1,6-hexanediol and other linear or branched alkylene diols having up to about 20 carbon atoms. The aliphatic diol chain ex-tender may be monoethylene glycol, 1,4-butanediol or a mixture thereof. The chain extender may be present in an amount of about 0.1 percent by weight or greater of the polyol component, about 1.0 percent by weight or greater, about 2.0 percent by weight or greater, about 3 percent by weight or greater or about 4 percent by weight or greater. The chain extender may be present in an amount of about 25 percent by weight or less of the polyol component, about 10 percent by weight or less, about 9 percent by weight or less, about 8 percent by weight or less, about 7 percent by weight or less or about 6 percent by weight or less. The aliphatic diol chain extender or mixture thereof may be present in an amount of 2.5 to 6 equivalents per equivalent of ingredient a) of the polyol component.

The polyol component contains ingredient c) one or more latent room temperature organometallic catalysts. A latent room temperature organometallic catalysts is a catalyst that functions to catalyze the reaction of the nucleophiles (polyols, polyamines) present in the polyol component with the isocyanates present in the isocyanate component. The latent organometallic catalyst may show delayed action. The latent room temperature catalysts may exhibit accelerated catalytic activity when exposed to temperatures at a temperature of 40° C. or greater. Any latent room temperature organometallic catalysts which provides good open time, acceptable initial lap shear strengths and which maintains an acceptable level of reactivity after partial curing and storage may be utilized. Exemplary classes of latent room temperature organometallic catalysts contain tin, zinc or bismuth. Exemplary latent room temperature organometallic catalysts include zinc alkanoates, bismuth alkanoates, dialkyltin alkanoates, dialkyl tin mercaptides, dialkyl tin bis(alkylmercaptoacetates), dialkyltin thioglycolates or mixtures thereof. Exemplary latent room temperature organometallic catalysts include zinc neoalkanoates, bismuth neoalkanoates, dialkyltin neoalkanoates, dialkyl tin mercaptides, dialkyl tin bis(alkylmercapto acetates), dialkyltin thioglycolates or mixtures thereof. The latent room temperature organometallic catalysts may be dialkyl tin mercaptides, dialkyl tin bis(alkylmercaptoacetates), dialkyltin thioglycolates or mixtures thereof. The latent room temperature organometallic catalysts may be dialkyltin thioglycolates or mixtures thereof. The alkyl groups on the latent room temperature organo-metallic catalysts may be any alkyl groups of about 1 or more carbon atoms or 4 or greater carbon atoms. The alkyl groups on the latent room temperature organometallic catalysts may be any alkyl groups of about 20 or less carbon atoms or 12 or less carbon atoms. Exemplary alkyls groups include methyl, butyl, octyl and dodecyl groups. The latent room temperature organometallic catalysts may be present in an amount sufficient to provide good open time, acceptable initial lap shear strengths and which maintains an acceptable level of reactivity after partial curing and storage.

The latent room temperature organometallic catalysts may be present in an amount of about 0.005 percent by weight or greater based on the weight of polyol component, about 0.01 percent by weight or greater, about 0.020 percent by weight or greater, or about 0.030 percent by weight or greater. The latent room temperature organometallic catalysts may be present in an amount of about 1.0 percent by weight or less based on the weight of the polyol component, about 0.080 percent by weight or less, about 0.070 percent by weight or less or about 0.050 percent by weight or less. These amounts are based on active catalyst, and ignore the mass of solvents or other materials as may be present in a commercially available catalyst product.

The polyol component may contain compounds having primary and/or secondary amino groups. Exemplary compounds having primary and/or secondary amino groups include polyoxyalkylene polyamines having 2 or greater amines per polyamine, 2 to 4 amines per polyamine, or 2 to 3 amines per polyamine. The polyoxyalkylene poly-amines may have a weight average molecular weight of about 200 or greater or about 400 or greater. The polyoxyalkylene polyamine may have a weight average molecular weight of about 5,000 or less or about 3,000 or less. Exemplary polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The compounds having primary and/or secondary amino groups are present in a sufficient amount to prevent the composition from sagging once mixed and applied. The compounds having primary and/or secondary amino groups may be present in the polyol component in an amount of about 0.2 percent by weight or greater, about 0.3 percent by weight or greater or about 0.5 percent by weight or greater. The compounds having primary and/or secondary amino groups may be present in the polyol component in an amount of about 6 percent by weight or less, about 4 percent by weight or less or about 2 percent by weight or less.

The polyol component may further include one or more optional components. The polyol component may contain at least one particulate filler; however, if a filler is present, it constitutes no more than about 80 weight percent of the total weight of the polyol component. The filler may constitute about 25 weight percent or greater of the polyol component, or about 30 weight percent or greater. The filler may constitute about 80 weight percent or less of the polyol component, about 60 weight percent or less or about 50 weight percent or less. The particulate filler is in the form of particles having a size of about 50 nm to about 100 μm. The fillers may have a particle size (d50) of about 250 nm or greater, about 500 nm or greater or about 1 μm or greater. The fillers may have a particle size (d50) of about 50 μm or less, about 25 μm or less or about 10 μm or less. Particles sizes are conveniently measured using dynamic light scattering methods, or laser diffraction methods for particles having a size below about 100 nm. The particulate filler is a solid material at room temperature, is not soluble in the other ingredients of the polyol component or in the polyisocyanate component or any ingredient thereof. The filler is a material that does not melt, volatilize or degrade under the conditions of the curing reaction between the polyol and polyisocyanate components. The filler may be, for example, an inorganic filler such as glass, silica, boron oxide, boron nitride, titanium oxide, titanium nitride, fly ash, calcium carbonate, various alumina-silicates including clays such as wollastonite and kaolin, metal particles such as iron, titanium, aluminum, copper, brass, bronze and the like; thermoset polymer particles such as polyurethane, cured particles of an epoxy, phenol-formaldehyde, or cresol-formaldehyde resin, crosslinked polystyrene and the like; thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. In some embodiments, the particulate filler excludes carbon particles. The particles in some embodiments have an aspect ratio of about 5 or less, about 2 or less, or about 1.5 or less. Some or all of the filler particles can be grafted onto one or more of the polyether polyol(s) that constitute ingredient (a) of the polyol component.

Another optional ingredient is one or more dispersing aids, which wet the surface of the filler particles and help them disperse into the polyether polyol(s). These may also have the effect of reducing viscosity. Among these are, for example, various dispersing agents sold by BYK Chemie under the BYK, DISPERBYK and ANTI-TERRA-U tradenames, such as alkylammonium salt of a low-molecular-weight polycarboxylic acid polymer and salts of unsaturated polyamine amides and low-molecular acidic polyesters, and fluorinated surfactants such as FC-4430, FC-4432 and FC-4434 from 3M Corporation. Such dispersing aids may constitute, for example, up to 2 weight percent, preferably up to 1 weight percent, of the polyol component.

Another useful optional ingredient of the polyol component is a desiccant such as fumed silica, hydrophobically modified fumed silica, silica gel, aerogel, various zeolites and molecular sieves, and the like. One or more desiccants may constitute about 1 percent by weight or greater based on the weight of the polyol component and about 5 weight percent or less, or about 4 weight percent or less of the polyol component, and may be absent from the polyol component.

The polyol component may further include one or more additional isocyanate-reactive compounds, different from ingredients a), b) and c) of the polyol component, and which do not contain amine hydrogen atoms. If any such additional isocyanate-reactive compound(s) are present, they may constitute no more than 10 percent, no more than 5 percent or no more than 2 percent of the weight of the polyol component. Examples of such additional isocyanate-reactive compounds include, for example, one or more polyester polyols; one or more polyether polyols containing at least 50 weight percent polymerized ethylene oxide; one or more polyether polyols having a hydroxyl equivalent weight of 100 to 499; and one or more hydroxy-functional crosslinkers having three or more isocyanate-reactive groups per molecule and a hydroxyl equivalent weight of up to 499.

The adhesive preferably is non-cellular, and for that reason, the polyol component preferably contains about 0.5% by weight or less, about 0.1%, by weight or less of organic compounds having a boiling temperature of 80° C. or below, and about 0.1% by weight or less, or about 0.05% by weight or less, of water and/or other chemical blowing agents that produce a gas under the conditions of the curing reaction.

The polyol component may contain about 10 weight percent or less, about 5 weight percent or less, or about 1 weight percent or less, of a plasticizer such as a phthalate, terephthalate, mellitate, sebacate, maleate or other ester plasticizer, a sulfon-amide plasticizer, a phosphate ester plasticizer, or a polyether di(carboxylate) plasticizer. Such a plasticizer may be absent from the polyol component.

The polyisocyanate component contains one or more polyisocyanate compounds. The polyisocyanate preferably is a mixture of one or more isocyanate-terminated prepolymers having at least 2 isocyanate groups per molecule and an isocyanate equivalent weight of 700 to 3500, and one or more low equivalent weight polyisocyanate compounds that have an isocyanate equivalent weight of up to 350 and 2 to 4 isocyanate groups per molecule. When such a mixture is present, the prepolymer may constitute 20 to 65 percent of the weight of the polyisocyanate component. In some embodiments, the prepolymer constitutes 20 to 60 percent, 20 to 50 percent or 25 to 35 percent of the weight of the polyisocyanate component. The low equivalent weight polyisocyanate, when such a mixture is present, may constitute 20 to 50 weight percent of weight of the polyisocyanate component. The isocyanate content of the prepolymers may be about 1 percent by weight or greater, about 6 percent by weight or greater, about 8 percent by weight or greater or about 10 percent by weight or greater. The isocyanate content in the isocyanate functional prepolymers may be about 35 percent by weight or less, about 30 percent by weight or less, about 25 percent by weight or less or about 15 percent by weight or less.

The prepolymer may be a reaction product of one or more aromatic diisocyanates having a molecular weight of up to 350 with i) at least one 700 to 3000 molecular weight homopolymer of poly(propylene oxide) having a nominal hydroxyl functionality of 2 to 4, or ii) a mixture of i) with up to 3 parts by weight, per part by weight of i), of a 2000 to 8000 molecular weight polyether polyol which is a copolymer of 70 to 99 weight percent propylene oxide and 1 to 30 weight percent ethylene oxide and has a nominal hydroxyl functionality of 2 to 4. The poly(propylene oxide) used to make the prepolymer may have a molecular weight of 800 to 2000 or from 800 to 1500, and has and may have a nominal functionality of 2 to 3, especially 2. A copolymer of 70 to 99 weight percent propylene oxide and 1 to 30 weight percent ethylene oxide used to make the pre-polymer may have a molecular weight of 3000 to 5500 and a nominal functionality of 2 to 3.

The reaction of polyisocyanate and polyol(s) produces prepolymer molecules having a polyether segment that is capped with the polyisocyanate, so the molecules have terminal isocyanate groups. Each prepolymer molecule contains a polyether segment that corresponds to the structure, after removal of hydroxyl groups, of a polyol used in the prepolymer-forming reaction. If a mixture of polyols is used to make the prepolymer, a mixture of prepolymer molecules is formed.

The isocyanate-terminated prepolymer has an isocyanate equivalent weight of about 700 to about 3500, about 700 to about 3000 or about 1000 to about 3000. The equivalent weight for purposes of this invention is calculated by adding the weight of the polyol(s) used to prepare the prepolymer and the weight of polyisocyanate(s) consumed in reaction with the polyol(s), and dividing by the number of moles of isocyanate groups in the resulting prepolymer. The polyisocyanate used to make the prepolymer can be any of the low equivalent weight polyisocyanate compounds mentioned below, or a mixture of two or more of these. The prepolymer has at least 2, 2 to 4, or 2 to 3, isocyanate groups per molecule. The isocyanate groups of the prepolymer may be aromatic, aliphatic (including alicyclic), or a mixture of aromatic and aliphatic isocyanate groups. The isocyanate groups on the prepolymer molecules may be aromatic. The low equivalent weight polyisocyanate compound(s) in some embodiments have an isocyanate equivalent weight of 80 to 250, 80 to 200, or 80 to 180. If a mixture of polyisocyanate compounds is present, the mixture may have, for example, an average of 2 to 4 or 2.3 to 3.5 isocyanate groups per molecule.

All or a portion of the low equivalent weight polyisocyanate compound may have aromatic isocyanate groups. Among the useful aromatic polyisocyanate compounds m-phenylene diisocyanate, toluene-2,4-diisocyanate, toluene-2,6-diisocyanate, naphtha-ylene-1,5-diisocyanate, methoxyphenyl-2,4-diisocyanate, diphenyl-methane-4,4'-diiso-cyanate, diphenylmethane-2,4'-diisocyanate, 4,4'-biphenylene diisocyanate, 3,3'-dimeth-oxy-4,4'-biphenyl diisocyanate, 3,3'-dimethyl-4-4'-biphenyl diisocyanate, 3,3'-dimethyl-diphenyl methane-4,4'-diisocyanate, 4,4',4''-triphenyl methane triisocyanate, polymethyl-ene polyphenylisocyanate (PMD1), toluene-2,4,6-triisocyanate and 4,4'-dimethyl-diphenylmethane-2,2',5,5'-tetraisocyanate. Modified aromatic polyisocyanates that contain urethane, urea, biuret, carbodiimide, uretoneimine, allophonate or other groups formed by reaction of isocyanate groups are also useful. The aromatic polyisocyanate may be MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages. All or a portion of the low equivalent weight polyisocyanate compounds may be one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

At least some of the polyisocyanate groups present in the polyisocyanate component may be aromatic isocyanate groups. If a mixture of aromatic and aliphatic isocyanate groups are present, about 50% or more by number or about 75% or more by number, are aromatic isocyanate groups. 80 to 98% by number of the isocyanate groups may be aromatic, and 2 to 20% by number may be aliphatic. All of the isocyanate groups of the prepolymer may be aromatic, and the isocyanate groups of the polyisocyanate compound(s) having an isocyanate equivalent weight of up to 350 may be a mixture of 80 to 95% aromatic isocyanate groups and 5 to 20% aliphatic isocyanate groups.

A prepolymer may be prepared by combining the polyol or polyol mixture with an amount of low equivalent weight polyisocyanate compound(s) significantly greater than needed to simply cap the polyol(s). After reaction, this produces a mixture of the prepolymer and unreacted low equivalent weight polyisocyanate compounds. If desired, an additional amount of polyisocyanate compound(s) can then be blended into this mixture. The polyol(s) may be combined and reacted with an excess of one or more aromatic polyisocyanates to produce a mixture of prepolymer and unreacted starting polyisocyanate compounds, and this mixture then is combined with one or more aliphatic polyisocyanates. The prepolymer may be made in a reaction of the polyol(s) with MDI, PMDI, a polymeric MDI, a derivative of any one or more of these that contains biuret, carbodiimide, uretoneimine and/or allophonate, or a mixture of any two or more of these, to produce a mixture of prepolymer and unreacted starting polyisocyanates, and the mixture is then combined with one or more aliphatic polyisocyanates, especially an aliphatic polyisocyanate based on hexamethylene diisocyanate.

The polyisocyanate component may contain up to 50% by weight of one or more particulate inorganic fillers as described before. The polyisocyanate component contains about 10% by weight or more, about 20% by weight or more of one or more such fillers, and may contain, for example, 20 to 50% or 30 to 40% by weight thereof. The filler amounts are based on the weight of the polyisocyanate component. The filler may exclude carbon particles.

The polyisocyanate component may also contain one or more other additional ingredients, such as those described above with respect to the polyol component. As with the polyol component, the polyisocyanate component may contain about 0.5% by weight or less, about 0.1%, by weight or less of organic compounds having a boiling temperature of 80° C. or less, about 0.1% by weight or less, or about 0.05% by weight or less, of water and/or other chemical blowing agents that produce a gas under the conditions of the curing reaction. The polyisocyanate compound may contains at most, amounts of plasticizers as described before with respect to the polyol component. The isocyanate component may be devoid of a plasticizer.

The two-part adhesive disclosed contains one or more phenol blocked cyclic tertiary amines. Any phenol blocked cyclic tertiary amine which provides good open time, acceptable initial lap shear strengths and which maintains an acceptable level of reactivity after partial curing and storage may be utilized. Exemplary phenol blocked cyclic tertiary amines include phenol blocked cyclic amidine catalysts, aromatic or cycloaliphatic structures with pending amines or aromatic or cycloaliphatic structures with nitrogens incorporated into the ring structures and the like. Exemplary cyclic amidine catalysts include 1,8-diazabicycloundec-7-ene (DBU) or 1,5-Diazabicyclo[4.3.0]non-5-ene (DBN) and the like. The blocking agent may be a phenolic compound such as phenol itself or a substituted phenol. The phenol-blocked cyclic amidine catalyst can be incorporated into either the polyol component or the polyisocyanate component. The phenol blocked cyclic tertiary amine catalyst may be present in an amount sufficient to provide good open time, acceptable initial lap shear strengths and which maintains an acceptable level of reactivity after partial curing and storage. The phenol blocked cyclic tertiary amine catalyst may be present in an amount of about 0.01 percent by weight or greater based on the weight of the polyol or polyisocyanate component or about 0.015 percent by weight or greater. The phenol blocked cyclic tertiary amine catalyst may be present in an amount of about 2.0 percent by weight or less based on the weight of the polyol or polyisocyanate component, about 1.0 percent by weight or less or about 0.025 percent by weight or less.

The two-part adhesive disclosed contains one or more carboxylic acid blocked cyclic tertiary amine. Any carboxylic acid blocked cyclic tertiary amine which provides good open time, acceptable initial lap shear strengths and which maintains an acceptable level of reactivity after partial curing and storage may be utilized. Exemplary carboxylic acid blocked cyclic tertiary amines include carboxylic acid blocked cyclic amidine compounds, aromatic or cycloaliphatic structures with pending amines or aromatic or cycloaliphatic structures with nitrogens incorporated into the ring structures and the like. Exemplary cyclic amidine catalysts include 1,8-diazabicycloundec-7-ene (DBU), or 1,5-Diazabicyclo[4.3.0]non-5-ene (DBN) and the like. The blocking agent may be one or more aliphatic carboxylic acids having 1 to 24 carbon atoms, especially 1 to 8 carbon atoms. The carboxylic acid-blocked tertiary amines can be incorporated into either the polyol component or the polyisocyanate component. The carboxylic acid blocked cyclic tertiary amines may be present in an amount sufficient to provide good open time, acceptable initial lap shear strengths and which maintains an acceptable level of reactivity after partial curing and storage. The carboxylic acid blocked cyclic tertiary amines may be present in an amount of about 0.01 percent by weight or greater based on the weight of the polyol or polyisocyanate component or about 0.015 percent by weight or greater. The carboxylic acid blocked cyclic tertiary amines may be present in an amount of about 2.0 percent by weight or less based on the weight of the polyol or polyisocyanate component, about 1.0 percent by weight or less or about 0.025 percent by weight or less.

The polyol component and polyisocyanate component are formulated such that when equal volumes of the components are provided, the isocyanate index may be 1.0 to 1.8, 1.1 to 1.8, or 1.15 to 1.65. "Isocyanate index" is the ratio of the number of isocyanate groups in the polyisocyanate component to the number of isocyanate-reactive groups in the polyol component. The isocyanate index, at a 1:1 volume ratio, may be 1.15 to 1.65.

Disclosed is a process for bonding two substrates. The polyol component and the isocyanate component are mixed to form the mixed adhesive. The ratio of these materials is generally sufficient to provide an isocyanate index of 1.0 to 1.8, 1.1 to 1.8 or 1.15 to 1.65. The mixed adhesive is formed into an adhesive layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The methods used to mix the isocyanate component with the polyol component, form the adhesive layer and cure the adhesive are, broadly speaking, not critical and a variety of apparatus can be used to perform these steps. Thus, the isocyanate component and polyol component can be mixed and applied to the substrates manually, in various types of batch apparatus, and/or using various sorts of automated metering, mixing and dispensing equipment.

The polyol component and isocyanate component often will react spontaneously upon mixing at room temperature (about 22° C.) and cure without the need to heat the adhesive to a greater temperature. Curing may be effected by simply mixing the components at a temperature of, for example, 0 to 35° C. and allowing the components to react at that temperature. At about room temperature, the two-part adhesive may exhibit an open time of about 3 minutes or greater, about 5 minutes or greater, about 8 minutes or greater, about 9 minutes or greater or 10 to 15 minutes, measured as described in the following examples.

Heating can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. and then heated to a higher cure temperature. The substrate can be heated before applying the adhesive if desired. If an elevated temperature is used in the curing step, such a temperature may be, for example, about 36° C. or greater, or about 50° C. or greater. Such a temperature may be, for example, about 150° C. or less, or about 130° C. or less.

A layer of the two-component polyurethane adhesive may be formed at a bondline between two substrates to form an assembly. The adhesive layer is then at least partially cured at the bondline by applying infrared radiation to the assembly. Infrared radiation may be applied, for example, until the temperature of the adhesive layer reaches about 80° C. or greater, or about 90° C. or greater, or about 150° C. or less, or about 130° C. or less. The assembly so heated may be maintained under infrared radiation until the adhesive layer has been exposed to such temperatures for a period of 5 seconds or more to effect the partial or complete cure. For example, the infrared radiation may be continued until the temperature of adhesive layer is 80 to 150° C., preferably 90 to 130° C., for 5 to 60 seconds, 5 to 45 seconds, for 10 to 30 seconds or for 10 to 20 seconds, at which time the exposure to infrared radiation is discontinued.

If only a partial cure is performed by applying infrared radiation, the partial curing can be either or both of two types. In one type of partial curing, the entire adhesive layer is cured, but only partially. Such partial curing preferably is at least to the gel point, at which a three-dimensional polymeric network is formed in the adhesive layer by the curing of the components. In another type of partial curing, only one or more predetermined, localized portions of the adhesive layer at the bondline are cured. This produces an adhesive layer having at least partially cured portions and portions that have undergone little or no cure. The predetermined, localized portions of the adhesive layer may constitute, for example, 5 to 80%, 5 to 50% or 5 to 25% of the total area of the adhesive layer. Subsequent to the partial curing step, the uncured or only partially cured portions of the adhesive layer then are cured further to form a fully-cured adhesive. The subsequent step of completing the cure can be done at approximately room temperature (such as from 15 to 35° C.) or an elevated temperature such as greater than 35° C. to 80° C.

A two-step curing process as just described is useful in a variety of manufacturing, building and construction, and in-field assembly and repair applications. By performing only a partial cure by applying infrared radiation, a rapid bonding of the adhesive to the substrate can be obtained in a very short time, often a matter of 10 seconds to 2 minutes. The bonded parts can be handled after 1 hour or less from partial cure, after about 10 minutes or less after partial cure, about 3 minutes or less after partial cure or about 1 minute or less after partial cure. This initial bond is often robust enough that the assembly can withstand further handling. Further handing may include, for example, transporting the assembly to a downstream work station, and further manufacturing steps which might include joining the assembly to one or more other components, various shaping and/or machining steps, the application of a coating, and the like. The completion of the cure can take place during and/or after such additional handling steps. Often, the adhesive will fully cure without exposing it to elevated temperature, infrared radiation or other energy source, due at least in part to the catalytic action of the organometalic catalyst. The acid-blocked cyclic amidine catalyst may de-block during the infrared heating stage, to produce an active catalyst that promotes the cure during the subsequent curing step, even if that subsequent step is performed without additional applied energy.

The substrates are not limited. They may be a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition disclosed. The substrates may be are individual plies that are glued together using the adhesive to form a multilayer laminate. The substrates may be building members.

Other components commonly used in curable compositions may be used in the compositions disclosed. Such materials are well known to those skilled in the art and may include ultraviolet stabilizers and antioxidants and the like. The compositions may also contain durability stabilizers known in the art. Among preferred durability stabilizers are alkyl substituted phenols, phosphites, sebacates and cinnamates. A preferred class of durability stabilizers includes organophosphites. The organophosphites are preferably present in a sufficient amount to enhance the durability of bond of the adhesive composition to the substrate surface. Such phosphites are disclosed in Hsieh et al. U.S. Pat. No. 7,416,599 column 10, line 47 to Column 11 line 25, incorporated herein by reference. Among preferred organophosphites are poly(dipropyleneglycol) phenyl phosphite (available from Dover Chemical Corporation under the trademark and designation DOVER-PHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphite may be present in the composition in an amount of about 0.1 percent by weight or greater or about 0.2 percent by weight or greater based on the weight of the composition. The organophosphite may be present in the composition in an amount of about 1.0 percent by weight or less or about 0.5 percent by weight or less based on the weight of the composition.

The composition may be formulated by blending the components together using means well known in the art. Generally, the components are blended in a suitable mixer. Such blending is preferably conducted in an inert atmosphere in the absence of oxygen and atmospheric moisture to prevent premature reaction The compositions disclosed may be formulated to provide an open time of about 5 minutes or greater, 7 minutes or greater, about 8 minutes or greater or about 9 minutes or greater. The two part adhesive compositions may be formulated to provide an open time of about 20 minutes or less or about 15 minutes or less. "Open time" is understood to mean the time after application of the composition to a first substrate until it starts to become a high viscous paste and is not subject to deformation during assembly to conform to the shape of the second substrate and to adhere to it. Open time may be measured by rheology reactivity wherein the rheology reactivity is about 500 seconds or greater or about 600 seconds or greater.

The compositions disclosed may exhibit a lap shear strength after 1 hour room temperature cure of greater than 0.6 MPa, about 0.8 MPa or greater or about 1 MPa or greater. The compositions may exhibit a low loss in Lap shear strength after storage of one month, for example less than 42 percent reduction is lap shear strength or about 40 percent or less loss in lap shear strength.

Molecular weights as described herein are number average molecular weights which may be determined by Gel Permeation Chromatography (also referred to as GPC). For polyurethane prepolymers, it is also possible to calculate approximate number average molecular weight from the equivalent ratio of the isocyanate compounds and of the polyol compounds with which they are reacted as known to the persons skilled in the art.

Illustrative Embodiments

The following examples are provided to illustrate the disclosed compositions, but are not intended to limit the scope thereof. All parts and percentages are by weight unless otherwise indicated.

Ingredients

Polyol A is a polypropylene homopolymer with an average molecular weight of 1000 g/mol molecular weight and a OH number of approximately 55 mg KOH/g.

Polyol B is nominally trifunctional a glycerin initiated ethylene oxide based propoxylated triol with an average molecular weight of 1800 g/mol molecular weight and an OH number of approximately 35 mg KOH/g.

1,4-butane diol.

The Aminated Polyether is a 400 g/mol, difunctional poly (propylene oxide) terminated in primary amine groups, sold as Jeffamine™ D-400 by Huntsman Corporation. The Aliphatic Polyisocyanate is a commercially available product based on hexamethylene diisocyanate, having an isocyanate equivalent weight of 193 (Desmodur™ N3400 from Bayer Material Sciences).

The Liquid MDI is a commercially available modified MDI product having an isocyanate functionality of about 2.2 and equivalent weight of about 143.

The Prepolymer is made by combining Polyol A (17.74 parts), a nominally difunctional poly(propylene oxide) having a molecular weight of about 2000 and a hydroxyl equivalent weight of about 1000 (12.09 parts), the "liquid MDI" product (27.5 parts), and a plasticizer (18.07 parts) and heating the resulting mixture to a constant isocyanate content, to form a plasticized prepolymer. The plasticized prepolymer is then blended with a pure MDI product containing mostly the 4,4'-isomer and having an isocyanate equivalent weight of about 125 (5.08 parts) and carbon black (19 parts).

Catalyst A is a dioctyltinthioglycolate catalyst. It contains essentially 100% active material.

Catalyst B is a phenol-blocked 1,8-diazabicycloundec-7-ene catalyst that contains about 50% by weight active material.

Catalyst C is a carboxylic acid blocked 1,8-diazabicycloundec-7-ene.

Calcined china clay (55% $SiO_2$, 45% $Al2O3$) with an average particle size of approximately 2 μm (90%>10 μm), a BET surface area of 8.5 m2/g and a pH of 6.0-6.5.

Hydrophobically modified polydimethylsiloxane coated fumed silica.

Molecular sieves of the type 4A.

Carbon black.

Di-isononyl-phthalate.

Open time is evaluated for each of the examples by manually dispensing the corresponding polyol and polyisocyanate components in a 1:1 by weight ratio, using Kroger TS 400 double cartridge application gun with a mounted static mixer unit, at an application pressure of at least 6 bar (606 kPa) a 30 to 50 mm bead having an 8 to 10 mm diameter onto a polyethylene film, and compressing the bead periodically with a wooden spatula until the adhesive no longer sticks to the wooden surface. The measured time is defined as open time of the adhesive.

Samples for room temperature and 180 second IR cured lap shear strength measurements are prepared by forming a layer of the adhesive between two 100×45×2.2 mm cleaned carbon fiber reinforced plastic samples (Voraforce™ 5300, from The Dow Chemical Company), that overlap to form a bond area of 10×25 mm. The adhesive layer is 1.5 mm thick. The samples are manually ground with a 320 grinding pad prior to testing, until a uniform visual appearance is achieved. The adhesive is applied and the test samples assembled at room temperature.

The reactivity of the adhesive is measured by rheology in oscillating mode with a parallel plate 20 mm diameter, 1 mm plate distance set-up. The measurements are done at 10 Hz with a constant deformation of 0.062%. The complex viscosity is plotted against the time and the time at which the slope of viscosity is changed more than 30° is considered to be the reactivity.

In each case, multiple test specimens are prepared. Duplicate samples are evaluated for lap shear strength after one hour curing at 23° C. and 50% relative humidity (RT cure) and separately after a 180 second IR cure. In the 180 second IR cure, the test specimen is placed in IR curing equipment and exposed to an IR source for 180 seconds such that the temperature of the adhesive increases, reaching 100-110° C. for the final 10-20 seconds of the heating process. Lap shear strength is measured on the samples according to DIN EN 527 using a Zwick 1435 testing device equipped with a FHM 8606.00.00 or 8606.04.00 mounting device, beginning 5 to 10 seconds after the IR heating step is completed. E-coat substrates are Cathoguard 500 e-coated steel panels 100× 25×0.8 mm. E-coated substrates are cleaned with heptane. The flash off time of the solvent after cleaning prior to adhesive application is 5 minutes. Composite fiber reinforced plastic (CFRP) substrates with a dimension of 100× 45×2.2 mm CFRP substrates are ground manually, using a 320 grinding pad on wet CFRP panels until homogeneous optical appearance is achieved or used without cleaning or mechanical pretreatment. Panels are successively dried 8 hours at 80° C. Adhesive bond dimensions of 10×25×1.5 mm are used for the lap shear specimens. Lap shear specimens are tested after 1 hour curing time at 23° C./50 percent relative humidity or respectively after described heat accelerated curing process.

For heat accelerated curing, the assembled CFRP-CFRP lap shear specimens are placed after assembly in IR curing equipment. Lap shear specimens are built up with a bond height of 1.5 mm and an overlap area of 45×10 mm. The CFRP substrate, exposed to the IR source is heated during a 120 second curing process in such a way, that 100-110° C. adhesive temperature is reached for a time period of 10-20 seconds.

Polyol Part Preparation Process

The following ingredients are combined, blended and stored in air moisture proof containers useful in two-part manual dispensing guns. In the Polyol Component the Calcined china clay is present in an amount of 43.5 weight percent in Example 1 and Comparative Examples 1 and 3 and 43.4 in all other examples and comparative examples. The Catalyst amounts are shown in Table 3

TABLE 1

| Polyol Component | |
|---|---|
| Component | Weight Percent |
| Polyol B | 48.9 |
| 1,4-butanediol | 5 |
| Calcined china clay | 43.5 or 43.4* |
| Coated fumed silica | 1.5 |
| Molecular sieves | 1.0 |
| Catalyst A | Varied |
| Catalyst B | Varied |
| Catalyst C | Varied |

Isocyanate Component

The following ingredients are combined, blended and stored in air moisture proof containers useful in two-part manual dispensing guns.

TABLE 2

| Isocyanate components | |
|---|---|
| Component | Weight Percent |
| Carbon Black | 19 |
| Aliphatic Polyisocyanate | 5 |
| Liquid methylene diphenyl isocyanate | 22.5 |
| Prepolymer | 53.5 |

Testing

The polyol side and the isocyanate side are utilized in a 1 to 1 ratio. Reactivity is measured by rheology. 1 hour and 2 hour lap shear strengths are measured with e-coated steel substrates with 15×25×1.5 mm adhesion dimension. Lab shear heat cure experiments are run with a 180 s heating cycle and Dow CFK substrates with adhesion dimensions 45×15×1.5 mm. The results are compiled in Table 3. In Table 3 C means comparative. For C3 to C6 the IR Lapshear Strength (MPa) Initial results show blisters.

The results are summarized in Table 3. Comparative Example I comprises 0.05 weight percent dioctyltinthioglycolate catalyst in combination with 0.05 weight percent phenol-blocked 1,8-diazabicycloundec-7-ene catalyst which exhibits a one hour (1 h) room temperature (23° C., RT) lap shear strength of 1.82 MPa which is above the desired handling strength required of >1 MPa. When the sample is stored in cartridges for one month at 23° C. and the lap shear tests are repeated, a lap shear strength of 1.02 MPa is observed relating to a loss in lap shear strength of 44 percent. The heat cure performance is measured by accelerating the cure by heating with IR equipment and measuring the lap shear strength immediately after the heating process. The IR lap shear strength of comparative example I is 1.86 MPa, also above the required handling strength of >1 MPa. The open time, determined by rheology reactivity is with 445 s, however, below the desired open time reactivity of >490 s. Comparative Example II comprises 0.05 weight percent dioctyltinthioglycolate catalyst in combination with 0.075 weight percent phenol-blocked 1,8-diazabicycloundec-7-ene catalyst. The higher weight percent phenol-blocked 1,8-diazabicycloundec-7-ene catalyst level provides higher 1 hour RT lap shear strengths but the loss in lap shear strength after storing the material for one month at room temperature is 58% offering a lap shear strength of 0.86 MPa. The reactivity is 435 seconds which is below the desired reactivity. Comparative Example III bears 0.05 weight percent dioctyltinthioglycolate catalyst and 0.05 weight percent carboxylic acid blocked 1,8-diazabicycloundec-7-ene, which provides a reactivity of 450 s (below requirement) and a 1 h RT lap shear strength of 1.48 MPa and a IR lap shear strength of 0.76 MPa (below requirement). Comparative Example IV bears 0.04 weight percent dioctyltinthioglycolate catalyst with 0.1 weight percent carboxylic acid blocked 1,8-diazabicycloundec-7-ene resulting in higher 590 s reactivity but low 1 h RT lap shear strength of 0.5 MPa and low IR lap shear strengths of 0.08 MPa. When higher levels of 0.069 weight percent dioctyltinthioglycolate catalyst are used with 0.1 weight percent carboxylic acid blocked 1,8-diazabicycloundec-7-ene, however, the reactivity is again low at 420 s, the 1 h RT lap shear strength are good with 1.64 MPa but the IR lap shear strength are low. Comparative example VI comprises 0.05 weight percent dioctyltinthioglycolate catalyst in combination with weight percent carboxylic acid blocked 1,8-diazabicycloundec-7-ene resulting in a low reactivity of 425 s, good 1 h RT lap shear strength but low IR lap shear strengths of 0.48 MPa.

In Example I 0.05 weight percent dioctyltinthioglycolate catalyst is used with a combination of 0.02 weight percent phenol-blocked 1,8-diazabicycloundec-7-ene catalyst and 0.05 weight percent carboxylic acid blocked 1,8-diazabicycloundec-7-ene catalyst. This combination exhibits a reactivity of 500 s and a 1 hour RT lap shear strength of 1.2 MPa. Also the heat cure performance is good with 1.5 MPa IR lap shear strength. This catalyst combination of Example I exhibits a loss in lap shear strength of 24 percent after storing the material 1 month at room temperature. When the phenol-blocked 1,8-diazabicyclo-undec-7-ene catalyst level is further increased to 0.04 weight percent (Example I) and 0.06 weight percent Example 3) the reactivity is at 490 seconds and the 1 hour RT lap shear strengths are at 1.34, and 1.52 MPa, respectively. The loss in lap shear strength after 1 month room temperature storing is for Examples 1 and 2 at 40 and 41%, respectively.

of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated

TABLE 3

Results

| Test | Example | | | | | | | | |
|---|---|---|---|---|---|---|---|---|---|
| | C 1 | C 2 | C 3 | C 4 | C 5 | C 6 | 1 | 2 | 3 |
| Catalyst A weight % | .05 | .05 | .05 | .04 | .06 | .05 | .05 | .05 | .05 |
| Catalyst B weight % | .05 | .075 | — | — | — | — | .02 | .04 | .06 |
| Catalyst C weight % | — | — | .05 | 0.1 | 0.1 | 0.15 | .05 | .05 | .05 |
| TFT (min) | 8.5 | 8 | 7 | 9.5 | 6.5 | 6 | 9.5 | 9 | 9 |
| Reactivity (s) initial | 445 | 435 | 450 | 590 | 420 | 425 | 500 | 490 | 490 |
| Reactivity (s) 7 d RT | 460 | 455 | 450 | 580 | 430 | 440 | 500 | 490 | 490 |
| Reactivity (s) 1 month RT | 480 | 480 | 470 | — | — | — | 500 | 490 | 490 |
| 1 h RT Lap Shear Strength (MPa) Initial | 1.82 | 2.05 | 1.48 | 0.51 | — | — | 1.23 | 1.34 | 1.52 |
| 1 h RT Lap Shear Strength (MPa) 7 d RT | 1.25 | 1.45 | 1.33 | — | 1.64 | 1.91 | 1.19 | 1.05 | 1.32 |
| 1 h RT Lap Shear Strength (MPa) 1 mt RT | 1.02 | 0.86 | — | — | — | — | 0.93 | 0.81 | 0.9 |
| Loss in 1 h RT Lap Shear Strength 1 mt RT (%) | 44 | 58 | — | — | — | — | 24 | 40 | 41 |
| 2 h RT Lap Shear Strength (MPa) Initial | 4.65 | 4.75 | 3.6 | 2.56 | — | — | 3.78 | 3.78 | 3.78 |
| 2 h RT Lap Shear Strength (MPa) 7 d RT | 3.06 | 3.99 | 3.51 | — | 4.08 | 4.13 | 3.85 | 3.65 | 3.82 |
| 2 h RT Lap Shear Strength (MPa) 1 mt RT | 3.49 | 3.23 | — | — | — | — | 3.02 | 3.19 | 3.43 |
| IR Lapshear Strength (MPa) Initial | 1.86 | 0.98 | 0.76 | 0.08 | 0.24 | 0.48 | 1.51 | 1.19 | 1.08 |
| IR Lapshear Strength (MPa) 7 d RT | 2.05 | 2.16 | — | — | — | — | 1.62 | 1.67 | 1.53 |
| IR Lapshear Strength (MPa) 1 mt RT | — | — | — | — | — | — | 1.5 | — | — |

A combination of two different tertiary amine salt catalysts phenol-blocked 1,8-diazabicycloundec-7-ene catalyst and carboxylic acid blocked 1,8-diazabicycloundec-7-ene catalyst with a tin catalyst (dioctyltinthioglycolate) provide the right combination of open time (reactivity) room temperature cure (1 h RT lap shear strength), heat cure (IR lap shear strength) as well as a robust formulation by not losing its reactivity over time (loss in 1 h RT lap shear strength when storing material one month at room temperature).

Parts by weight as used herein refers to 100 parts by weight of the composition specifically referred to. Any numerical values recited in the above application include all values from the lower value to the upper value in increments element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:
1. A composition comprising a polyol component and an isocyanate component, wherein:
   a) the polyol component includes;
      i) one or more polyols having a hydroxyl equivalent weight of 400 to 2000 and a nominal hydroxyl functionality of 2 to 4;

ii) one or more aliphatic diol chain extenders; and iii) one or more latent room temperature organometallic catalysts;

b) the polyisocyanate component includes:

iv) one or more polyisocyanate compounds;

wherein the polyisocyanate component includes isocyanate groups and the polyol component isocyanate-reactive groups wherein a ratio of a number of the isocyanate groups in the polyisocyanate component to a number of the isocyanate-reactive groups in the polyol component is about 1.0 to about 1.8; and v) one or more carboxylic acid-blocked cyclic amidine compounds and vi) one or more phenol-blocked cyclic amidine compounds are located in the polyol component or the isocyanate component and the composition is useful as a two-component polyurethane adhesive composition.

2. A composition according to claim 1 wherein the one or more latent room temperature organometallic catalysts contain tin, zinc or bismuth.

3. A composition according to claim 1 wherein the one or more latent room temperature organometallic catalysts are zinc alkanoates, bismuth alkanoates, dialkyltin alkanoates, dialkyl tin mercaptides, dialkyl tin bis(alkylmercaptoacetates), dialkyltin thioglycolates or mixtures thereof.

4. A composition according to claim 1 wherein the one or more latent room temperature organometallic catalysts are dialkyl tin mercaptides, dialkyl tin bis(alkylmercaptoacetates), dialkyltin thioglycolates or mixtures thereof.

5. A composition according to claim 1 wherein the one or more carboxylic acid-blocked cyclic amidine compounds and the one or more phenol-blocked cyclic amidine compounds comprise at least one of a carboxylic acid-blocked 1,8-Diazabicyclo[5.4.0]undec-7-ene) or 1,5-Diazabicyclo[4.3.0]non-5-ene or a phenol-blocked 1,8-Diazabicyclo[5.4.0]undec-7-ene) or 1,5-Diazabicyclo[4.3.0]non-5-ene.

6. A composition according to claim 1 wherein the one or more latent room temperature organometallic catalysts are present in an amount of about 0.005 to about 1.0 percent by weight based on the weight of the polyol component, the phenol blocked cyclic amidine compounds are present in an amount of about 0.01 to about 2.0 percent by weight based on the weight of the polyol or polyisocyanate component; and the carboxylic acid blocked cyclic amidine compounds are present in an amount of about 0.01 to about 2.0 percent by weight based on the weight of the polyol or polyisocyanate component.

7. A composition according claim 1 wherein the polyol component contains one or more particulate fillers.

8. A composition according to claim 1 wherein the polyisocyanate component contains one or more particulate fillers.

9. A composition according to claim 6 wherein:

the one or more polyols having a hydroxyl equivalent weight of 400 to 2000 and a nominal hydroxyl functionality of 2 to 4 are present in an amount of about 35 to about 80 percent by weight of the polyol component;

the one or more chain extenders are present in an amount of about 1 to about 10 percent by weight of the polyol component; and the polyisocyanate compound is present in an amount of about 20 to about 65 percent by weight of the polyisocyanate component.

10. A composition according to claim 1 wherein the one or more latent room temperature organometallic catalysts are present in an amount of about 0.020 to about 0.050 percent by weight based on the weight of the polyol component, the phenol-blocked cyclic amidine compounds are present in an amount of about 0.01 to about 1.0 percent by weight based on the weight of the polyol or polyisocyanate component; and the carboxylic acid-blocked cyclic amidine compounds are present in an amount of about 0.01 to about 1.0 percent by weight based on the weight of the polyol or polyisocyanate component.

11. A composition according to claim 1 wherein the carboxylic acid-blocked cyclic amidine compound includes a cyclic amidine compound blocked with an aliphatic carboxylic acid having 1 to 24 carbon atoms or a mixture of two or more thereof.

12. A composition according to claim 1 wherein the phenol-blocked cyclic amidine compound includes a cyclic amidine compound blocked with a phenol, a substituted phenol, or a mixture of two or more thereof.

13. A composition according to claim 1 wherein the polyisocyanate component includes both aliphatic and aromatic isocyanates.

14. A composition according to claim 1 wherein the particulate filler constitutes about 10 to about 50 percent of the weight of the polyisocyanate component.

15. A composition according to claim 1 wherein the particulate filler constitutes about 25 to about 60 percent of the weight of the polyol component.

16. A method comprising
a) contacting the polyol component and the isocyanate component according to claim 1 and mixing to form a homogeneous mixture;
b) applying the mixture to a first substrate;
c) contacting a second substrate with the first substrate with the mixture of part a disposed between the first and second substrate; and
d) exposing a portion of the mixture to heat under conditions such that the mixture partially cures sufficiently such that the first and second substrate are bonded such that the substrates can be moved.

17. A method according to claim 16 which includes e) heating the two substrates at a temperature for a time to fully cure the mixture to bond the two substrates together.

18. A method according to claim 16 wherein the heat is applied in step d by infrared heating.

19. A method according to claim 17 wherein:
the time frame between steps d and e is about 24 hours or more; or
at least one of the substrates is a fiber reinforced plastic.

20. A composition comprising a polyol component and an isocyanate component, wherein:
a) the polyol component includes;
i) one or more polyols having a hydroxyl equivalent weight of 400 to 2000 and a nominal hydroxyl functionality of 2 to 4;
ii) one or more aliphatic diol chain extenders; and
iii) one or more latent room temperature organometallic catalysts;
b) the polyisocyanate component includes:
iv) one or more polyisocyanate compounds;
wherein
v) one or more carboxylic acid-blocked cyclic amidine compounds and
vi) one or more phenol-blocked cyclic amidine compounds are located in the polyol component or the isocyanate component and the composition is useful as a two-component polyurethane adhesive composition.

* * * * *